(12) United States Patent
Barbarossa et al.

(10) Patent No.: US 7,577,369 B1
(45) Date of Patent: Aug. 18, 2009

(54) SYSTEMS FOR DEPLOYING AN OPTICAL NETWORK

(75) Inventors: Giovanni Barbarossa, Saratoga, CA (US); Roger A. Hajjar, San Jose, CA (US)

(73) Assignee: Avanex Corporation, Fremont, CA (US)

( * ) Notice: Subject to any disclaimer, the term of this patent is extended or adjusted under 35 U.S.C. 154(b) by 347 days.

(21) Appl. No.: 11/098,837

(22) Filed: Apr. 4, 2005

(51) Int. Cl.
*H04B 10/04* (2006.01)
*H04B 10/12* (2006.01)

(52) U.S. Cl. .................. 398/200; 398/193; 398/201
(58) Field of Classification Search .......... 398/147, 398/182–184; 359/246, 301; 372/26–27
See application file for complete search history.

(56) References Cited

U.S. PATENT DOCUMENTS

| | | |
|---|---|---|
| 6,525,857 B1 | 2/2003 | Way et al. |
| 6,738,181 B1 * | 5/2004 | Nakamoto et al. .......... 359/337 |
| 6,859,320 B2 * | 2/2005 | Yeh et al. .................. 359/577 |
| 6,941,045 B2 * | 9/2005 | Doerr .......................... 385/39 |
| 2002/0024704 A1 * | 2/2002 | Erdogan et al. ............ 359/156 |
| 2003/0002112 A1 * | 1/2003 | Hirano et al. .............. 359/161 |
| 2003/0185500 A1 | 10/2003 | Fells |
| 2003/0231886 A1 * | 12/2003 | Young et al. ............... 398/101 |
| 2004/0081410 A1 | 4/2004 | Aronson et al. |
| 2006/0002709 A1 * | 1/2006 | Dybsetter et al. ........... 398/135 |
| 2006/0120725 A1 * | 6/2006 | Braun et al. .................. 398/83 |

OTHER PUBLICATIONS

Oded Raz et al., Implementation of Photonic True Time Delay Using High-Order-Mode Dispersion Compensating Fibers, IEEE Photonics Technology Letters, vol. 16, No. 5, May 2004.*

* cited by examiner

*Primary Examiner*—Shi K Li
(74) *Attorney, Agent, or Firm*—Patterson & Sheridan, L.L.P.

(57) ABSTRACT

A transmitter on an integrated circuit chip is disclosed that employs a laser, modulator, and a dispersion compensator module and a modulator for overcoming chromatic dispersion and polarization dependent loss effects. With the present invention, the dispersion compensator module is placed on a chip, either integrated or monolithic, for operation with a laser and a modulator without the need to compensate for dispersion within a separate unit that is not part of the chip. The dispersion compensator module can be implemented, for example, with a ring resonator, an etalon or a Mach-Zehnder interferometer. In a first aspect of the invention, the optical transmitter module of the present invention provides a cost-effective solution for upgrading from an existing optical network to a faster optical network, such as upgrading from a 2.5 Gbps to a 10 Gbps network. In a second aspect of the invention, the optical transmitter module of the present invention provides a means to deploy an optical network at the transmission rate of 10 Gbps, 40 Gbps and faster.

12 Claims, 11 Drawing Sheets

SYSTEMS FOR DEPLOYING AN OPTICAL NETWORK

CROSS REFERENCE TO RELATED APPLICATIONS

This application relates to a concurrently filed U.S. patent application Ser. No. 11/098,838, entitled "Methods for Upgrading and Deploying an Optical Network" by Giovanni Barbarossa, filed on Apr. 4, 2005, owned by the assignee of this application and incorporated herein by reference.

BACKGROUND INFORMATION

1. Technical Field of the Invention

The invention relates generally to the field of fiber optic networks and systems and more particularly to dispersion compensation in optical and photonic networks.

2. Description of Related Art

The evolution of optical technologies intersecting with the industrial drive to utilize material science in designing an integrated circuit chip as a compact and cost-effective solution creates a platform for an innovative approach in addressing properties associated with optics and electronics. Traditional optical theories provide an understanding to make a purely optical-based device but the resulting product is frequently bulky in size, while electronic theories push relentlessly for a greater integration and miniaturization of integrated circuits by following the so-called Moore's Law. Emerging trends from this phenomenon present a new set of circumstances requiring optical solutions on a small chip that are able to compensate sporadic optical signal variations or perturbations.

A common well-known problem in high-speed transmission of optical signals is chromatic dispersion. Chromatic dispersion refers to the effect in which the various physical wavelengths of an individual optical channel either travel through an optical fiber or component at different speeds—for instance, longer wavelengths travel faster than shorter wavelengths, or vice versa—or else travel different path lengths through a component. This particular problem becomes more acute for data transmission speeds higher than 2.5 gigabits per second (Gbps). The resulting pulses of the signal will be stretched, will possibly overlap, and will cause increased difficulty for optical receivers to distinguish where one pulse begins and another ends. This effect seriously compromises the integrity of a signal. Therefore, for fiber optic communication systems that provide a high transmission capacity, the system must be equipped to compensate for chromatic dispersion.

In FIG. 1, there is shown a conventional single-channel system 100 illustrating the transmission path of an optical signal. The system 100 comprises a transmitter 110 optically connected to a receiver 150 by a dispersion compensation fiber (DCF) 130, an optical amplifier 140, and a single-mode optical fiber (SMF) 120. The DCF 130 is optically connected to the SMF 120 via, for instance, a splice and compensates for chromatic dispersion of an optical signal generated within the SMF 120 for the reason that the DCF 130 possesses dispersion slope characteristics of inverse signs relative to the SMF 120. The transmitter 110 comprises a laser 115 and a modulator 117 that are integrated together on a single chip with the DSF 130 positioned away from the transmitter.

Further, a conventional wavelength division multiplexer (WDM) system 200 for transmitting a plurality of optical channels over a single optical fiber is shown in FIG. 2. The WDM system 200 comprises a plurality of lasers 210, 220, 230 and 240, a plurality of modulators 211, 221, 231 and 241 that are optically coupled to an optical multiplexer (MUX) 250, a single-mode fiber (SMF) 255, a DCF 260, an optical amplifier 270 and a receiver 280. The WDM system 200 processes multiple optical channels represented by wavelengths $\lambda_1, \lambda_2, \lambda_3$ and $\lambda_4$ that are generated from the plurality of lasers 210, 220, 230 and 240. In the WDM system 200, the optical MUX 250 combines the four inputs to produce a Wavelength Division Multiplexed composite output optical signal. The multiplexed optical channels together comprise a single composite optical signal that propagates within the SMF 255 and the DCF 260. The DCF 260 is able to compensate for chromatic dispersion for the several channels or wavelengths. The optical amplifier 270 is able to amplify all the channels of the composite optical signal that is delivered to the receiver 280.

In both systems 100 and 200, the physical dimension of the DCF 130 in the system 100 and the DCF 260 in the system 200 is too bulky to fit on a chip. Accordingly, there is a need to design optical systems and methods that solve the dispersion effects functionally but, at the same time, significantly reduce the dimension of a dispersion compensation component for placement on an integrated circuit for operating with a laser-modulator combination.

SUMMARY OF THE INVENTION

The invention discloses and optical transmitter module disposed upon an integrated circuit chip that employs a laser, modulator, and a dispersion compensator module and a modulator for overcoming chromatic dispersion and polarization dependent loss effects. With the present invention, the dispersion compensator module is placed on a chip, either integrated or monolithic, for operation with a laser and a modulator without the need to compensate for dispersion within a separate unit that is not part of the chip. The dispersion compensator module can be implemented, for example, with a ring resonator, an etalon or a Mach-Zehnder interferometer.

In a first aspect of the invention, the optical transmitter module of the present invention provides a cost-effective solution for upgrading from an existing optical network to a faster optical network, such as upgrading from a 2.5 Gbps to a 10 Gbps network. In a second aspect of the invention, the optical transmitter module of the present invention provides a means to deploy an optical network at the transmission rate of 10 Gbps, 40 Gbps and faster.

A first preferred embodiment of an optical transmitter module in accordance with the present invention comprises a laser coupled to a modulator through a dispersion compensator module where the dispersion compensator module is designed so as to have an angle associated with a single polarized light that will either minimize the polarization dependent loss, or keep the polarization dependent loss unchanged or substantially the same. A second preferred embodiment of an optical transmitter module in accordance with the present invention comprises a laser coupled to a modulator that is further coupled to a dispersion compensator module wherein a polarization maintaining fiber is placed on either side of the modulator for maintaining the polarization of the single polarized light. Each of the transmitter embodiments can be designed as a stand-alone transmitter, as a component in a transceiver, or as a component in a transponder.

Advantageously, the present invention facilitates a simpler apparatus and method for upgrading an existing optical network at a central office by swapping, for example, a 2.5 Gbps line card with a 10 Gbps line card without the cumbersome and costly need, for instance, to install new dispersion compensating fiber within a fiber optic transmission system.

Other structures and methods are disclosed in the detailed description below. This summary does not purport to define the invention.

The invention is defined by the claims.

DETAILED DESCRIPTION OF PREFERRED EMBODIMENTS

Figure 1:
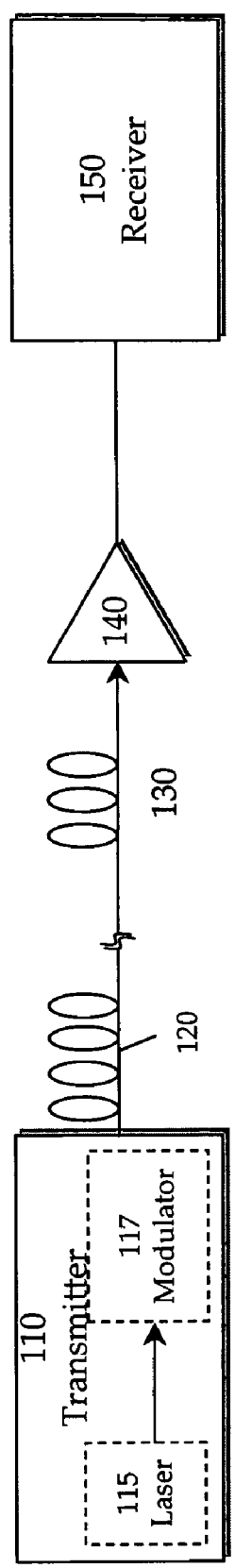
FIG. 1 depicts a prior art architectural diagram illustrating a single-channel optical transmission system.
Figure 2:
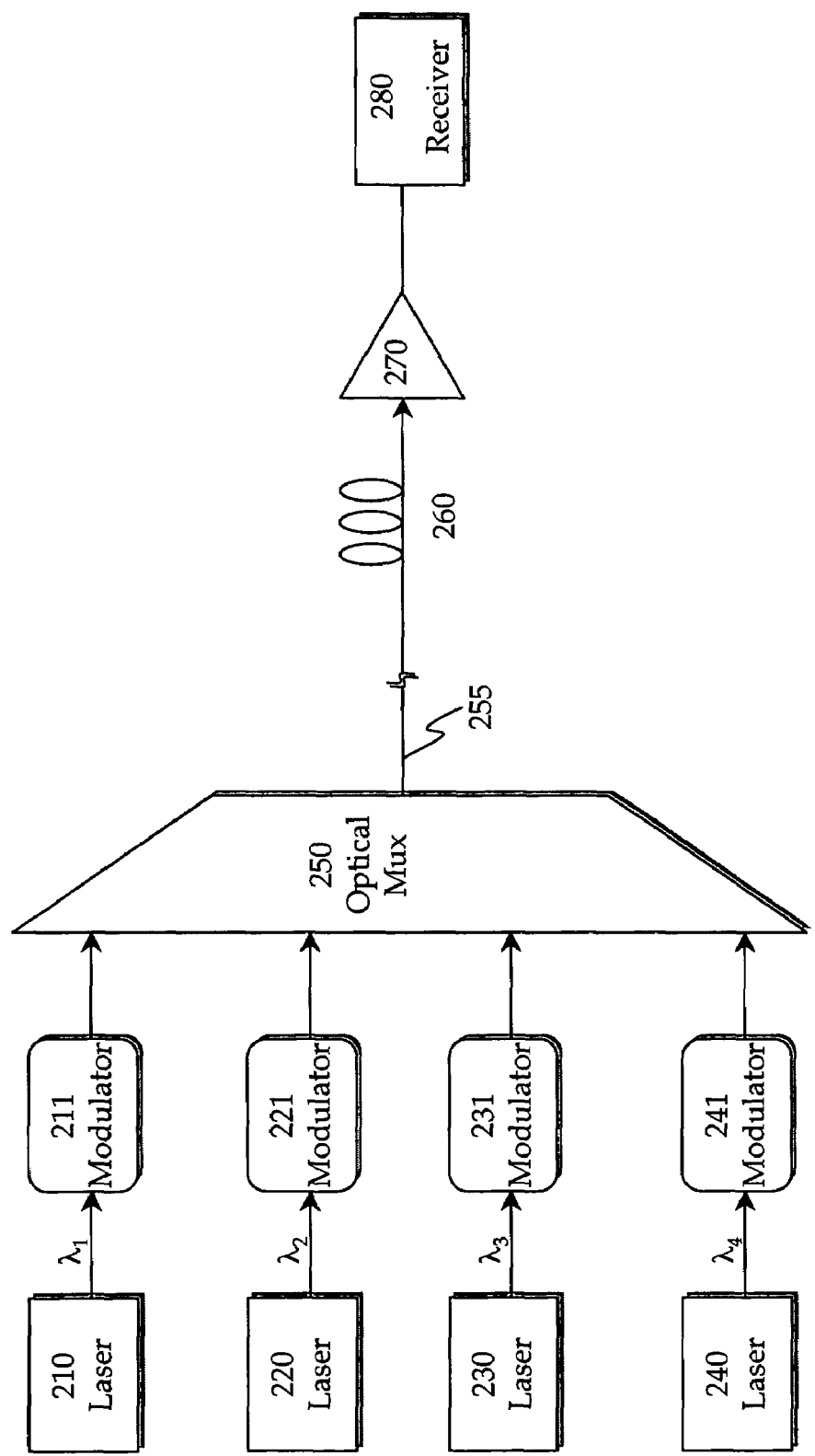
FIG. 2 depicts a prior art architectural diagram illustrating a multi-channel wavelength division multiplexing transmission system.
Figure 3:
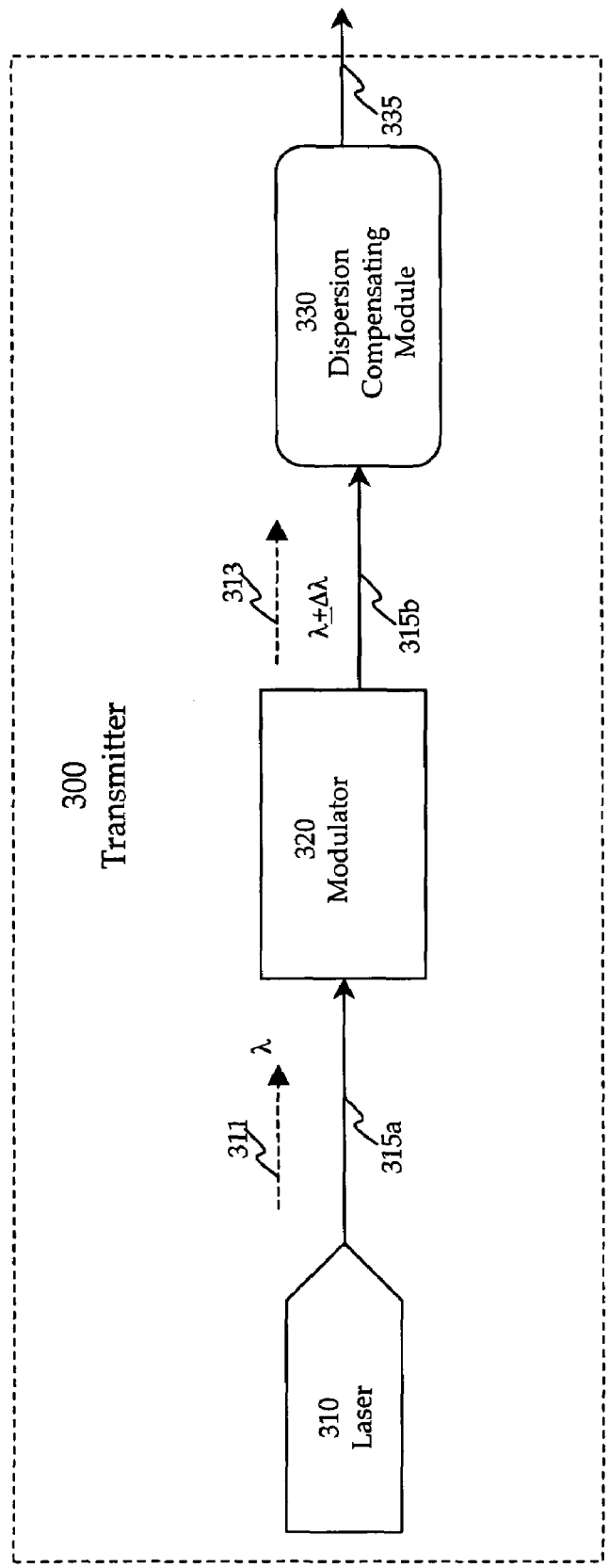
FIG. 3 depicts an architectural diagram illustrating a first preferred embodiment of an optical transmitter module with a dispersion compensator module in accordance with the present invention.

Referring to FIG. 3, there is shown a system diagram illustrating a first embodiment of a dispersion-compensating transmitter 300 in accordance with the present invention. The transmitter 300 comprises a laser 310 that is coupled to a modulator 320, which is further coupled to a dispersion compensator module 330. A first optical coupling 315a optically couples the laser 310 to an input of the modulator 320 and a second optical coupling 315b optically couples an output of the modulator 320 to the dispersion compensator module 330. The output of the dispersion compensator module 330 is optically coupled to an output optical line or system 335. The first 315a and second 315b optical couplings preferably are planar waveguide portions of the integrated transmitter module 300, which may be fabricated using known semiconductor fabrication techniques. The laser 310 generates a single polarized light 311 of wavelength % and transmits the single polarized light 311 to the modulator 320 through the first optical coupling 315a. The modulator 320 superimposes information bandwidth $\Delta\lambda$ upon the polarized light such that the resulting optical signal 313 emerging from the output of the modulator comprises a range of wavelengths, $\lambda \pm \Delta\lambda$. The dispersion compensator module 330 introduces dispersion, for instance, chromatic dispersion, into this range of wavelengths, this deliberately introduced dispersion being opposite in sign relative to the undesired dispersion (e.g., chromatic dispersion) introduced into the signal 313 as it propagates over the output optical line 335. The dispersion compensator module 330 generates an output light signal that has just one polarization which is substantially the same or unchanged from the single polarized light 113 generated by the laser 310.

The significance in keeping the polarization dependent loss substantially the same or unchanged as the light travels through the transmitter 300 (from the laser 310 to the modulator 330 and to the dispersion compensator module 330) eliminates the dependency on polarization dependent loss variations. Generally, the polarization of an optical signal is subject to environmental factors such as temperature which will cause the optical signal to fluctuate throughout a day. When the optical signal exceeds a certain maximum power ($P_{max}$), the optical signal determined by a receiver is truncated at or above $P_{max}$. Conversely, when the optical signal falls below or near the minimum power ($P_{min}$), a receiver may have difficulty ascertaining the integrity of the optical signal that may be distorted by noise.

Figure 4:
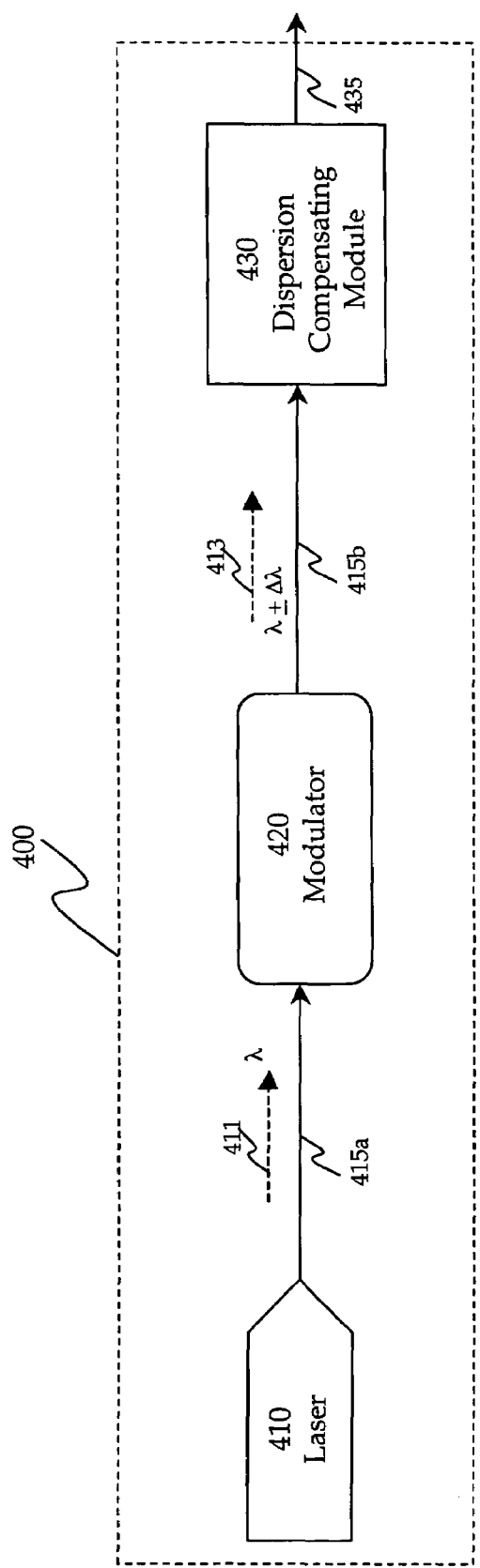
FIG. 4 depicts an architectural diagram illustrating a second preferred embodiment of an optical transmitter module with a dispersion compensator module in accordance with the present invention.

Turning now to FIG. 4, there is shown a system diagram illustrating a second embodiment of a dispersion compensating optical transmitter module 400 in accordance with the present invention. The transmitter module 400 comprises a laser 410, a first polarization maintaining fiber 415a, a modulator 420, a second polarization maintaining fiber 415b and a dispersion compensator module 430. There is a respective polarization maintaining fiber optically coupled to both the input and the output of the modulator 420 to preserve the polarization of the single polarized light generated from the laser 410. The output of the dispersion compensator module 430 is optically coupled to an output optical line or system 435. Initially, the laser 410 generates a single polarized light 411 of wavelength $\lambda$, and transmits the single polarized light 411 to the first polarization maintaining fiber 415a, which preserves the polarization of the single polarized signal 411 from the laser to the modulator 420. The modulator 420 generates an output optical signal 413 to the second polarization maintaining fiber 415b, which is to preserve the polarization of the polarized signal 413 before reaching the dispersion compensator module 430. Consequently, the dispersion compensator module 430 receives an input optical signal that is polarized. The dispersion compensator module 430 introduces chromatic dispersion into the range of wavelengths comprising the optical signal 413, this deliberately introduced chromatic dispersion being opposite in sign relative to the undesired chromatic dispersion introduced into the signal 413 as it propagates over the output optical line.

The dispersion compensator module 330 or 430 can be implemented, for example, with a ring resonator, an etalon, a Virtually Imaged Phased Array (VIPA) or a Mach-Zehnder interferometer. These types of dispersion compensator modules are sufficiently compact for incorporation onto an integrated chip with a laser and a modulator. However, the conventional chips made with dispersion compensator modules suffer from high polarization dependent loss (PDL) that is introduced into an optical signal.

One objective of the present invention is to minimize or eliminate the polarization dependent loss of a device. The use of polarization maintaining fibers ensures that a light or signal of a single polarization is propagated from a first optical component to a second optical component, thereby removing the effect of PDL on an optical signal.

Figure 5:
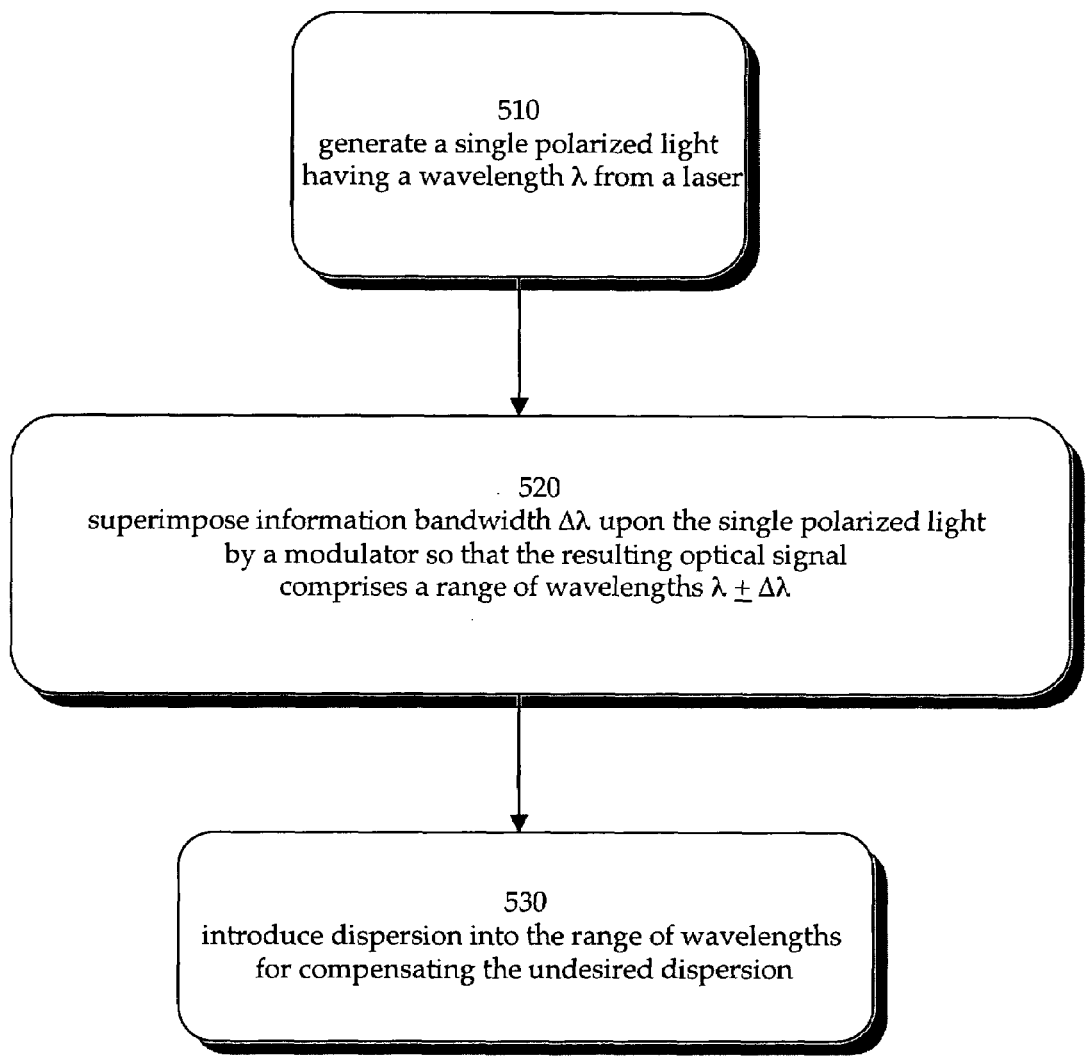
FIG. 5 depicts a flow diagram illustrating the operational steps of the optical transmitter module as shown in the first preferred embodiment in accordance with the present invention.

In FIG. 5, there is shown a flow diagram 500 illustrating the operational steps of the optical transmitter module 300 shown in the first embodiment in accordance with the present invention. In step 510, the laser 310 generates a single polarized light having a wavelength λ. In step 520, the modulator 320 superimposes information bandwidth Δλ upon the single polarized light by a modulator so that the resulting optical signal comprises a range of wavelengths λ±Δλ. In step 530, the dispersion compensating module 330 introduces dispersion into the range of wavelengths for compensating the undesired dispersion.

Figure 6:
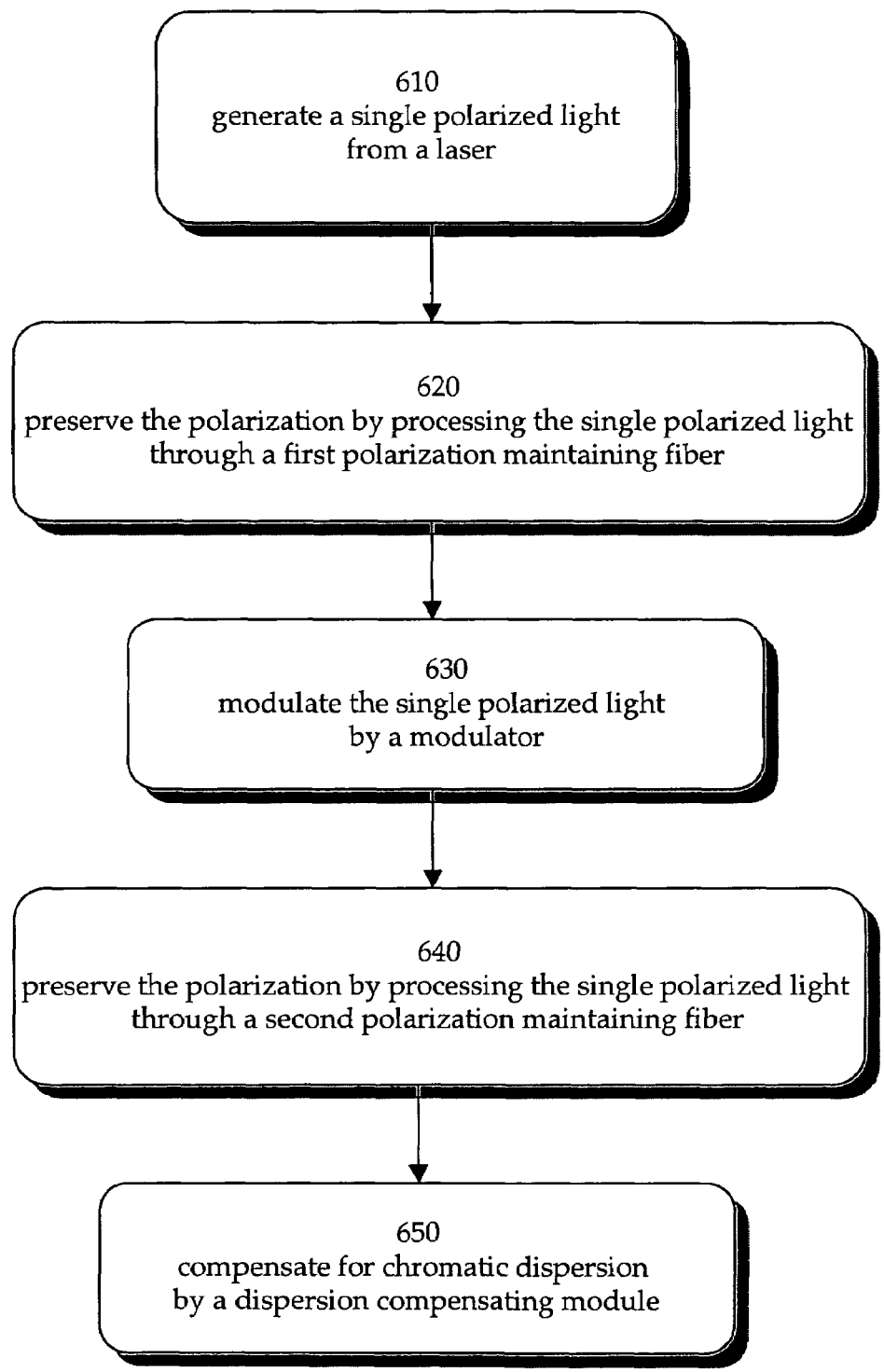
FIG. 6 depicts a flow diagram illustrating the operational steps of the optical transmitter as shown in the second preferred embodiment in accordance with the present invention.

FIG. 6 depicts a flow diagram 600 illustrating the operational steps of the transmitter 400 shown in the second embodiment in accordance with the present invention. In step 610, a laser generates a light with a single polarization. To preserve the polarization, a polarization maintaining fiber is used to direct the single polarized light to a modulator. In step 630, the modulator modulates the polarized light received from the laser so as to generate an optical signal. At step 640, a second polarization maintaining fiber is used to direct the modulated signal to a dispersion compensator module. At step 650, the dispersion compensator module 430 compensate for the chromatic dispersion of the optical signal.

Figure 7:
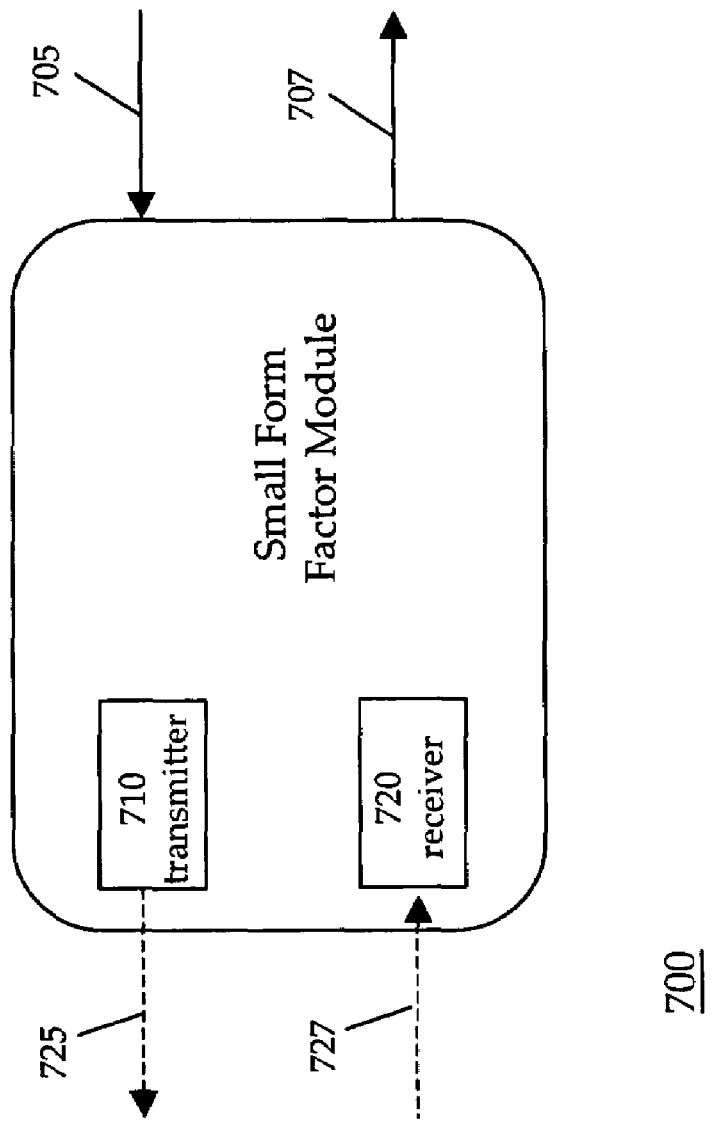
FIG. 7 depicts an architectural diagram illustrating an optical transceiver in accordance with the present invention.

The design of the transmitter 300 or the transmitter 400 can be incorporated into an optical transceiver 700 which comprises and optical transmitter 710 and an optical receiver 720 as shown in FIG. 7. The transmitter 710 receives an electrical signal 705 and converts it to an output optical signal 725. Moreover, the receiver 720 receives an input optical signal 727 and converts it to an output electrical signal 707. More specifically, the transmitter 710 of FIG. 7 can be implemented with either the transmitter 300 or the transmitter 400 (FIG. 4). Optionally, the transceiver 700 can be designed to operate according to the known standard of 10 Gigabit Small Form Factor Pluggable Module, which is also referred to as the XFP specification. The XFP specification is described in the document "10 Gigabit Small Form Factor Pluggable Module", incorporated by reference herein in its entirety.

Figure 8:
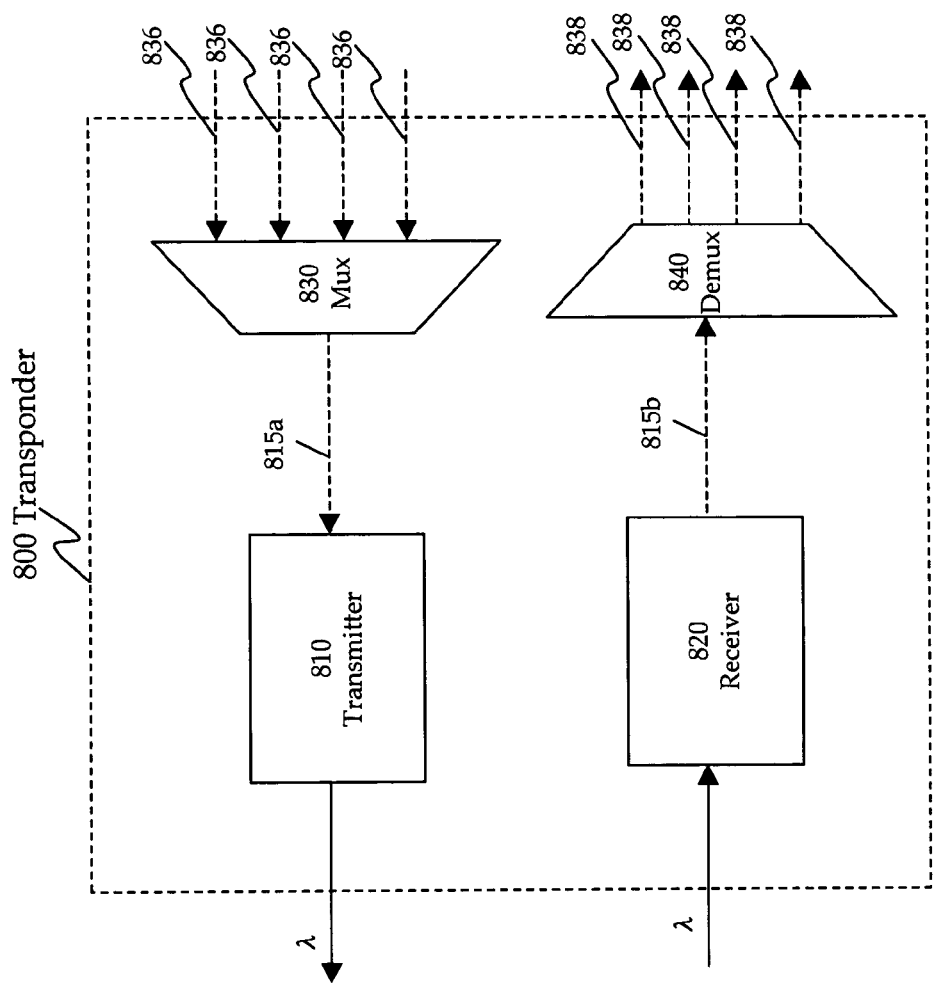
FIG. 8 depicts an architectural diagram illustrating an optical transponder in accordance with the present invention.

Moreover, the transmitter 300 or the transmitter 400 can be incorporated into a transponder 800 as shown in FIG. 8. The transponder 800 comprises a transmitter 810 electrically coupled to the output of an electronic multiplexer 830, and a receiver 820 electrically coupled to an electronic demultiplexer 840. The transponder 800 can be implemented with the transmitter 300 as described in the first embodiment or the transmitter 400 as described in the second embodiment in accordance with the present invention. Thus, the transmitter 810 of FIG. 8 may be either the transmitter 300 or the transmitter 400.

Figure 9:
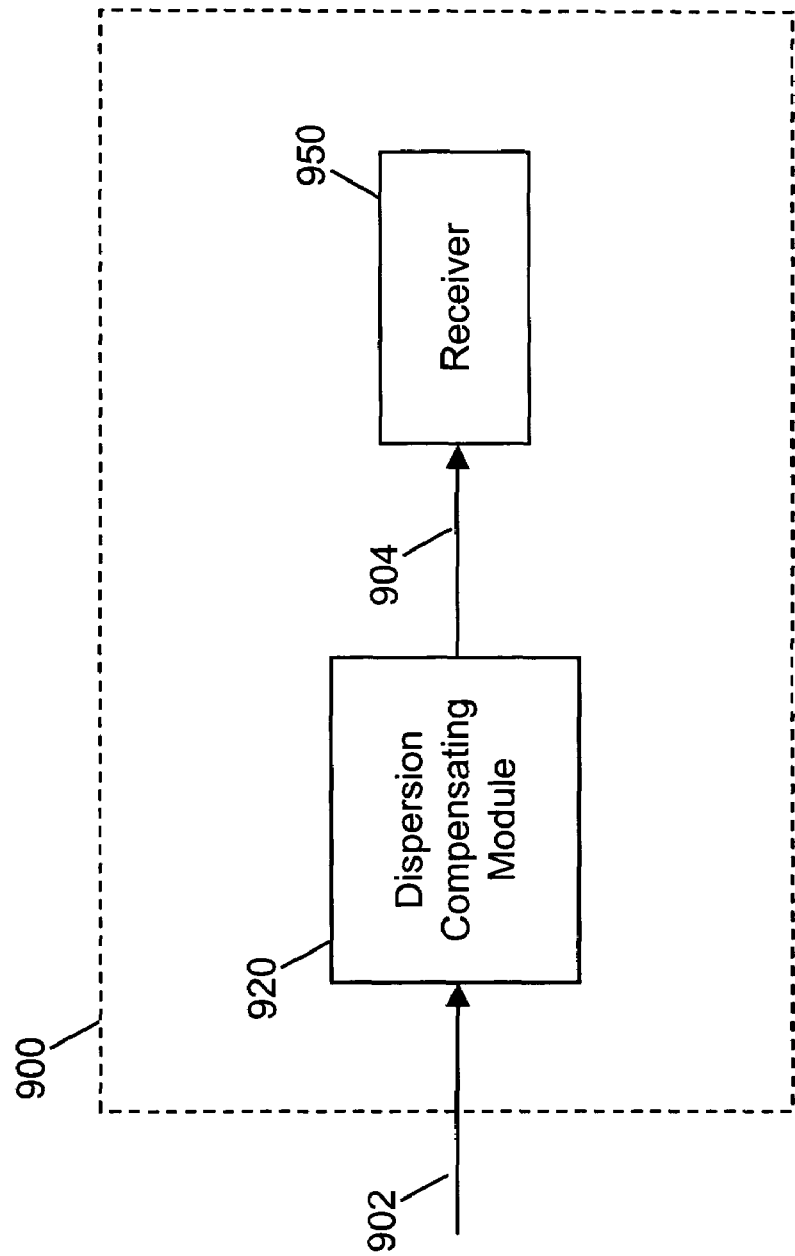
FIG. 9 depicts an architectural diagram illustrating a preferred embodiment of an optical receiver with a dispersion compensator in accordance with the present invention.

FIG. 9 illustrates an architecture in which dispersion compensation is implemented within a dispersion-compensating receiver chip. In the chip 900, a dispersion compensator 920 receives an optical signal requiring dispersion compensation from an optical fiber span 902. The dispersion compensator then relays a compensated optical signal to receiver 950 via on-chip optical coupling 904. The optical coupling 904 may be a planar waveguide portion of the chip 900. Preferably, the dispersion compensating module is of a type, such as a VIPA, that is not sensitive to the polarization characteristics of the incoming signal. Preferably, the dimensions and external interfaces of the dispersion-compensating receiver conform to a physical form-factor standard, such as the XFP standard.

Figure 10:
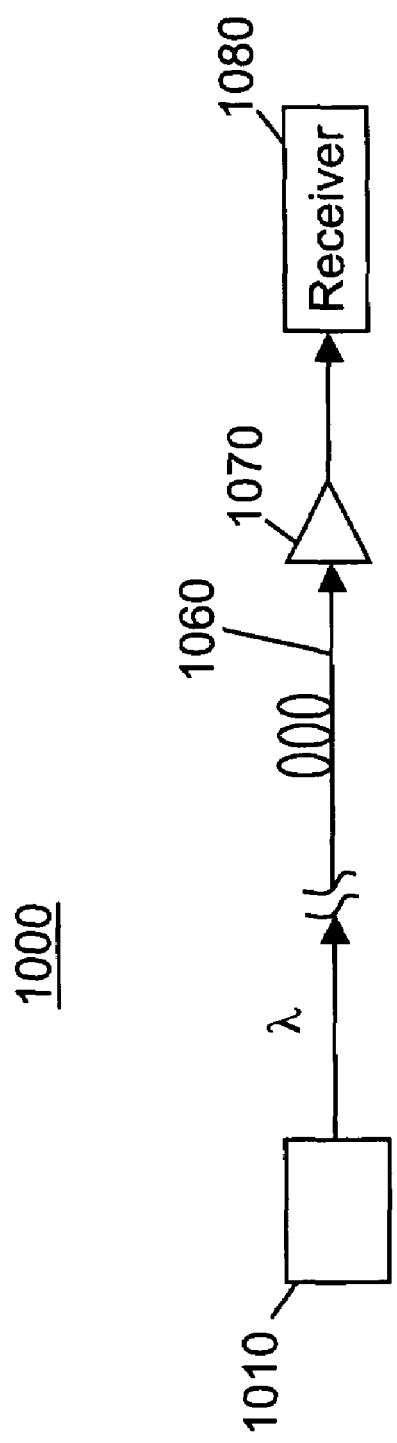
FIG. 10 depicts an architectural diagram of a first preferred embodiment, in accordance with the present invention, of an optical system having dispersion compensation.

FIG. 10 depicts an architectural diagram of a first preferred embodiment, in accordance with the present invention, of an optical system 1000 having dispersion compensation. A dispersion compensating transmitter module 1010, which may comprise either the module 300 (FIG. 3) or the module 400 (FIG. 4) transmits a single wavelength λ over a span of optical fiber 1060 that may include one or more optical amplifiers 1070. An optical receiver 1080, which may be either a conventional receiver or else an integrated dispersion compensating receiver, such as the integrated receiver 900 (FIG. 9) receives the wavelength λ. Dispersion pre-compensation can either be performed at the transmitter 1010 or else dispersion post-compensation can be performed at the receiver 1080. Also, partial dispersion compensation can be performed at both the transmitter and at the receiver. The advantage of the system 1000, relative to conventional systems within which dispersion compensation is performed within the span 1060, is that only the transmitter module or the receiver module or both need to be replaced when the system is upgraded to a faster data transmission rate (requiring greater dispersion compensation). If either or both of the transmitter 1010 or receiver 1080 conform to a physical form-factor standard, such as the XFP standard, then the replacement is simple.

Figure 11:
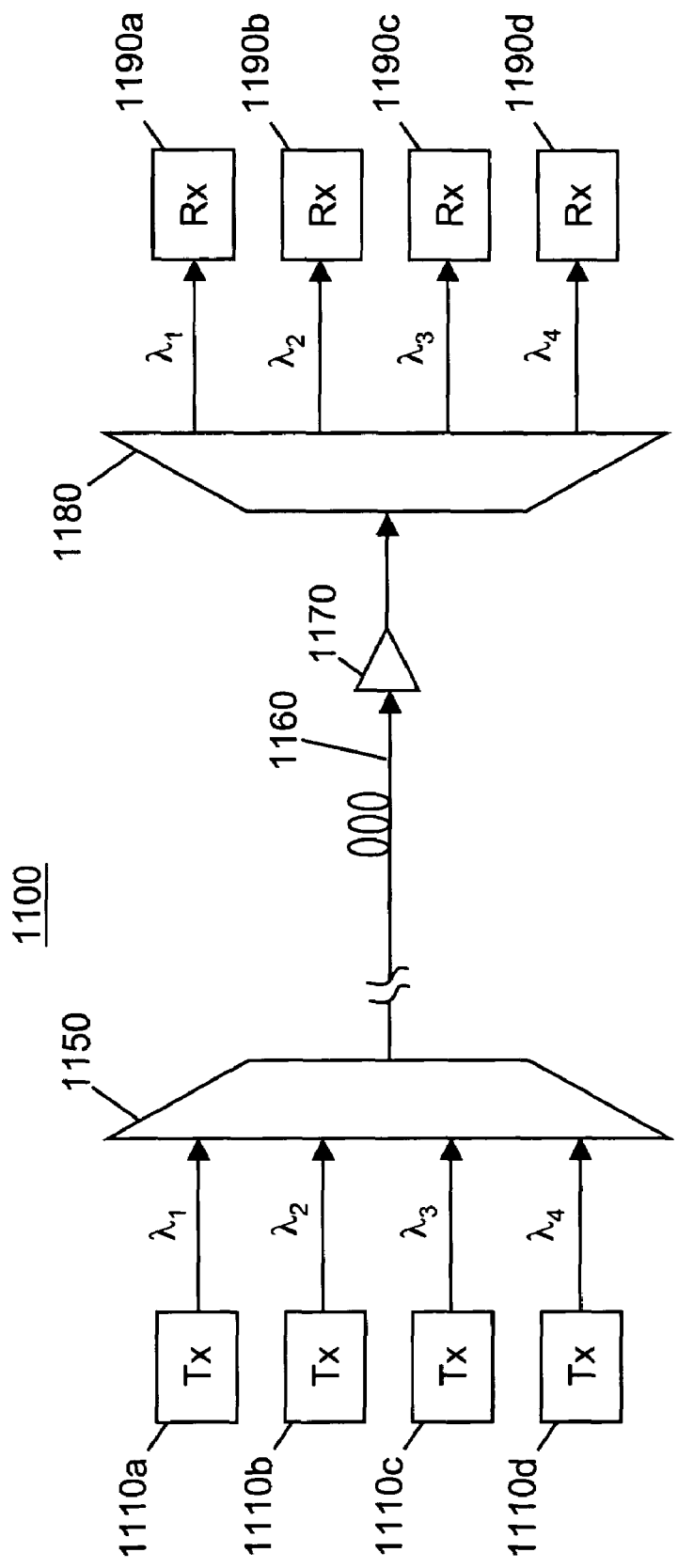
FIG. 11 depicts an architectural diagram of a second preferred embodiment, in accordance with the present invention, of an optical system having dispersion compensation.

FIG. 11 depicts an architectural diagram of a second preferred embodiment, in accordance with the present invention, of an optical system 1100 having dispersion compensation. In the system 1100, separate dispersion compensating transmitter modules 1110a-1110d, which may be either the apparatus 300 (FIG. 3) or the apparatus 400 (FIG. 4), deliver respective optical signals of respective wavelengths $\lambda_1$, $\lambda_2$, $\lambda_3$, and $\lambda_4$ to an optical multiplexer 1150. The multiplexer delivers a wavelength division multiplexed composite optical signal to a span of optical fiber 1160 that may include one or more optical amplifiers 1170. An optical de-multiplexer 1080, separates the wavelength channels so that each channel is directed to a respective receiver, 1090a-1090d, any one of or all of which may be either a conventional receiver or a dispersion compensating receiver module, such as the apparatus 900 (FIG. 9). In the system 1100 (FIG. 11) different wavelength channels may be separately upgraded to faster data transmission rates (requiring greater dispersion compensation), separately from other channels, by simply by swapping out the appropriate transmitter and/or receiver modules.

Those skilled in the art can now appreciate, from the foregoing description, that the broad techniques of the embodiments of the present invention can be implemented in a variety of forms. Therefore, while the embodiments of this invention have been described in connection with particular examples thereof, the true scope of the embodiments of the present invention should not be so limited since other modifications, whether explicitly provided for or implied by this specification, will become apparent to the skilled artisan upon a study of the drawings, specification and following claims.

We claim:

1. A system, comprising:
   a laser for generating a single polarized light of wavelength λ to an output;
   a modulator having an input and an output, the input of the modulator coupled to the output of the laser for receiving the single polarized light through a first planar waveguide portion between the laser and the modulator, the modulator superimposing information bandwidth Δλ upon the single polarized light thereby producing at the output of the modulator a resulting optical signal having a range of wavelengths λ+/−Δλ; and
   a dispersion compensating module having an input and an output, the input of the dispersion compensating module coupled to the output of the modulator for receiving the resulting optical signal through a second planar waveguide portion between the modulator and the dispersion compensating module, the dispersion compensator module generating a single polarized output light signal, wherein the laser, the first planar waveguide portion, the modulator, the second planar waveguide portion and the dispersion compensating module are integrated on a chip, wherein the single polarized output light signal has a polarization condition that is substantially the same as the single polarized light generated by the laser.

2. The system of claim 1, wherein the single polarized light from the laser has a polarization dependent loss that is substantially the same as the single polarized output light signal.

3. The system of claim 1, wherein the single polarized light from the laser has a polarization dependent loss that is unchanged as the single polarized output light signal.

4. The system of claim 1, wherein the dispersion compensating module comprises a ring resonator.

5. The system of claim 1, wherein the dispersion compensating module comprises an etalon.

6. The system of claim 1, wherein the dispersion compensating module comprises a Virtually Image Phased Array (VIPA).

7. The system of claim 1, wherein the dispersion compensating module comprises a Mach-Zehnder interferometer.

8. The system of claim 1, wherein the system comprises a transmitter, a transceiver or a transponder.

9. A system, comprising:
   first and second transmitters, the first transmitter transmitting a first wavelength $\lambda_1$, the second transmitter transmitting a second wavelength $\lambda_2$, wherein components of the first transmitter are integrated on a first chip and components of the second transmitter are integrated on a second chip;
   an optical multiplexer having inputs coupled to the first and second transmitters for delivering a wavelength division multiplexed composite optical signal to a span of optical fiber;
   an optical demultiplexer; and
   first and second optical receivers, the optical demultiplexer coupled to the span of optical fiber for separating wavelength channels such that each channel is directed to a respective receiver in the first and second optical receivers;
   wherein the first transmitter comprises:
   a first laser disposed on the first chip for generating a single polarized light of the wavelength $\lambda_1$ to an output;
   a first modulator having an input and an output disposed on the first chip, the input of the modulator coupled to the output of the first laser for receiving the single polarized light through a first planar waveguide portion formed on the first chip between the first laser and the first modulator, the first modulator superimposing information bandwidth $\Delta\lambda_1$ upon the single polarized light such thereby producing at the output of the first modulator a resulting optical signal having a range of wavelengths $\lambda_1 +/- \Delta\lambda_1$; and
   a first dispersion compensating module having an input and an output disposed on the first chip, the input of the first dispersion compensating module coupled to the output of the first modulator for receiving the resulting optical signal through a second planar waveguide portion formed on the first chip between the modulator and the dispersion compensating module, the first dispersion compensator module generating a first single polarized output light signal that has a polarization condition which is substantially the same as the single polarized light generated by the first laser.

10. The system of claim 9, wherein the second transmitter comprises:
   a second laser for generating a single polarized light of the wavelength $\lambda_2$ to an output;
   a second modulator having an input and an output, the input of the second modulator coupled to the output of the second laser for receiving the single polarized light through a third planar waveguide portion formed on the second chip between the second laser and the second modulator, the second modulator superimposing information bandwidth $\Delta\lambda_2$ upon the single polarized light such thereby producing at the output of the second modulator a resulting optical signal having a range of wavelength $\lambda_2 +/- \Delta\lambda_2$; and
   a second dispersion compensating module having an input and an output, the input of the second dispersion compensating module coupled to the output of the second modulator for receiving the resulting optical signal through a fourth planar waveguide portion formed on the second chip between the second modulator and the second dispersion compensating module, the second dispersion compensator module generating a second single polarized output light signal.

11. The system of claim 9, wherein the first transmitter conforms to a physical form factor standard, such as the XFP standard.

12. The system of claim 9, wherein the first receiver conforms to a physical form factor standard, such as the XFP standard.

* * * * *